O. K. BOGSTRAND.
SHIP'S ENGINE ROOM SIGNAL.
APPLICATION FILED APR. 15, 1915.

1,268,086.

Patented June 4, 1918.
3 SHEETS—SHEET 1.

WITNESSES:

INVENTOR
Ole K. Bogstrand
BY
ATTORNEY

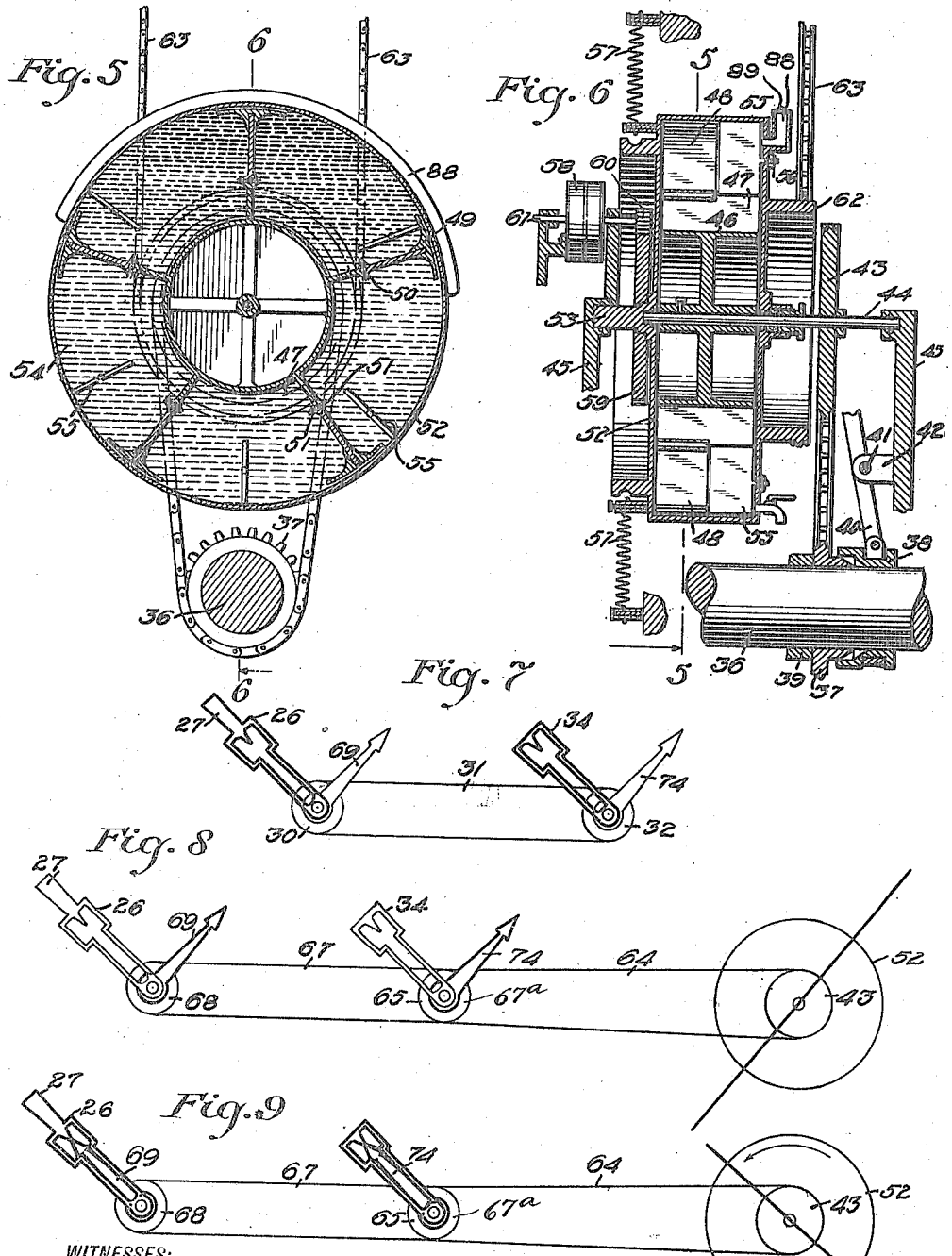

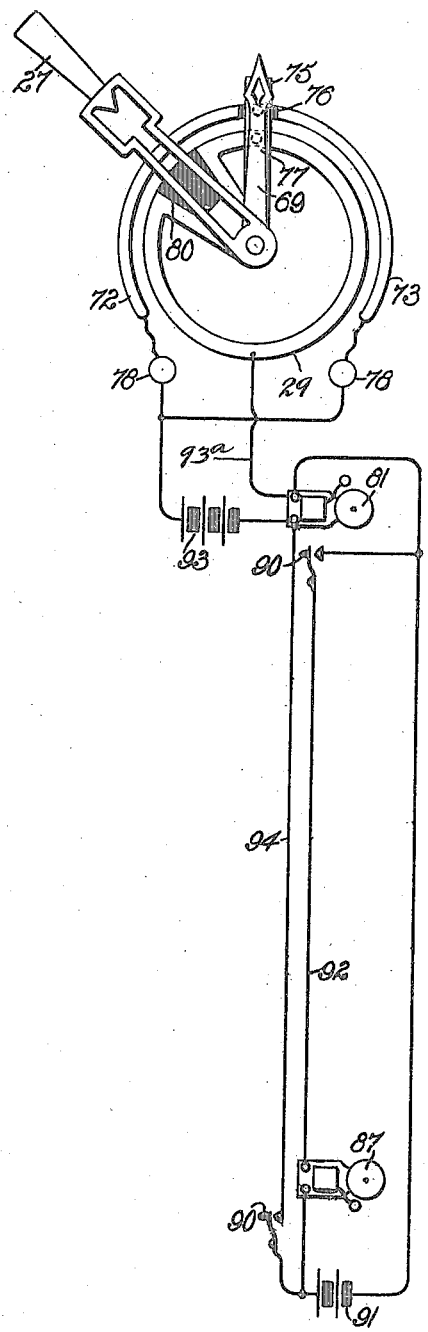

UNITED STATES PATENT OFFICE.

OLE K. BOGSTRAND, OF BROOKLYN, NEW YORK.

SHIP'S ENGINE-ROOM SIGNAL.

1,268,086.  Specification of Letters Patent.  Patented June 4, 1918.

Application filed April 15, 1915. Serial No. 21,544.

*To all whom it may concern:*

Be it known that I, OLE K. BOGSTRAND, a citizen of the United States, and a resident of the city of New York, borough of Brooklyn, in the county of Kings and State of New York, have invented a new and Improved Ship's Engine-Room Signal, of which the following is a full, clear, and exact description.

Among the principal objects which the present invention has in view are: to provide a signal of the character mentioned, with means for indicating automatically on the bridge of a vessel, the direction of rotation of the propeller shaft and approximately the rate of speed of said rotation; to provide means for varying the operation of the signal; and to provide means audible and visual for detecting and announcing the failure to comply with the command transmitted by the navigating officer to the engine room of said vessel.

*Drawings.*

Fig. 5 is a section taken on the line 5—5 in Fig. 6;

Fig. 6 is a section taken on the line 6—6 in Fig. 5;

Figs. 7, 8 and 9 are diagrammatic views arranged to show in successive order, the method of imparting the signal from the bridge to the engine room;

Fig. 10 is a detail view showing alarm bells with which the bridge instrument and engine room instrument are provided, and the electric circuits controlling the same.

*Description.*

Figure 1:
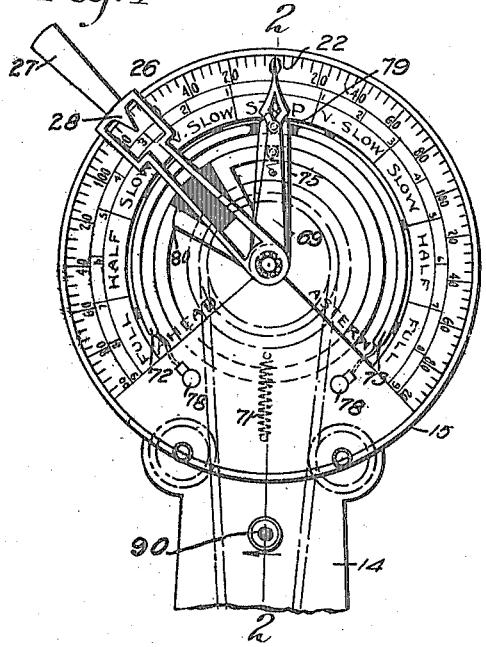
Figure 1 is a face view of a navigating bridge signal stand, constructed and arranged in accordance with the present invention.

As seen in the drawings, two signal apparatuses are employed. The apparatus which is located in service on the navigating bridge of the vessel, is mounted on a stand 14 and more particularly within a casing 15 thereon. The opposite sides of the casing 15 are closed by the glass faces 16, which are centrally pierced to allow of the passage of the pivoted shaft 17, which is mounted in bearings in dial plates 18, fixedly arranged in the said casing. The dial plates 18 are suitably engraved to show at opposite sides of a vertical plane, identical scales indicating information useful to the navigating officer. As for instance, the two scales indicated by the numeral 19, show the approximate number of revolutions per given period of time at which the propeller shaft is rotating. The scales indicated by the numeral 20, indicate approximately the rate in miles of the speed or travel of the vessel; or in other words, the speed which the number of revolutions indicated, would normally produce on the vessel. The scales indicated by the numeral 21, show the relative speeds of travel and the direction of travel. The neutral or zero point, indicated by the numeral 22, is associated with a space 23 between the scales 21, having inscribed thereon the word "Stop." These scales and markings as above detailed, will be found on both of the plates 18 in the bridge stand 14 and on the plate 24 of the engine room apparatus 25.

Fixedly mounted on the shaft 17, is a pointer yoke 26. The yoke 26 straddles the casing 15 and is provided with a handle 27 for manipulation by the navigating officer on the bridge of the vessel. The opposite legs of the yoke are formed as open-centered skeletons, and each is furnished with an inturned arrow head 28 to register with the various scales above noted. Also fixedly mounted on the shaft 17, is a mutilated disk 29 and a transmission gear wheel 30. The wheel 30 is shown as a sprocket wheel, but it will be understood that any reliable form of transmission wheel may be employed in its stead. The wheel 30 is operatively connected by means of a sprocket chain or belt 31, with a transmission wheel 32 on the shaft 33 of the engine room apparatus. At the outer side of the plate 24 of said engine room apparatus, the shaft 33 is fixedly provided with a skeleton pointer 34.

By reason of this arrangement, it is obvious the movement of the pointer yoke 26 on the bridge is accompanied by a corresponding movement of the pointer 34 in the engine room. In other words, the signal indicated by the navigating officer moving the pointer yoke 26, is transmitted to the engineer by means of the pointer 34, located in the engine room of the vessel.

The engineer has no direct control of the apparatus in the engine room. The pointer 34 is set as indicated by the operation of the yoke 26 on the navigating bridge. A pointer 74 with which the engine room apparatus is provided, is set by the operation of the vessel propeller shaft 36. The engineer is presumed to operate his engine to produce in the said propeller shaft, the movement indicated by the navigating officer when manipulating the yoke 26.

To accomplish the above-stated purpose, the shaft 36 is arranged with a sprocket wheel 37, as best shown in Figs. 5 and 6 of the drawings. The wheel 37 is for convenience of operation, loosely mounted on the shaft 36 for engagement by a movable clutch member 38. The wheel 37 is held in position against the thrust of the movable clutch member 38 by a collar 39, which is fixedly mounted on the said shaft. The movable clutch member 38 is controlled by the manually-operated lever 40. The lever 40 is pivoted by the shaft 41, in a suitable bracket 42.

The office of the wheel 37 is to drive the wheel 43 which is fixedly mounted on a shaft 44, supported in bearings in the standards 45. Fixedly mounted on said shaft is a drum 46. The drum 46 has a series of paddle-like members 47 extended radially therefrom, said members extending across the full length of the said drum. At one side of the central plane of said drum, the rocking brake shoes 48 are pivotally mounted on the members 47. The brake shoes 48 are each furnished with a widened head or brake shoe 49 and a foot 50. The feet 50 each have toes 51, which are normally held above corresponding heads on the members 47, and coöperates therewith to prevent the heads 49 gripping too firmly the surface of the casing 52.

The drum 46 with its members 47 and shoes 48 are mounted concentrically within a casing 52. The casing 52 is pivotally mounted on the shaft 44. The shaft 44 is in part supported by a trunnion 53 interposed between said shaft and one of the standards 45. In this manner the shaft 44 is supported as above stated, between standards 45.

The casing 52 is normally filled with a liquid, such as oil 54. The oil 54 is carried by the members 47 and shoes 48 about the shaft 44, as the drum 46 is rotated. To resist the flow of oil thus induced, the casing 52 is provided at certain intervals with pivoted blades 55. The blades 55 are adjustably mounted in the casing 52 by means of screw nuts 56, the threads whereof register with the threads of a screw-like projection provided on each of the blades 55 and extending through the side wall of the casing 52, as shown best in Fig. 6 of the drawings.

According as the blades 55 are disposed in a radial or partly radial position, the resistance of the circulation of oil is varied. Whatever the resistance is, it operates to rotate the casing 52 in correspondence with the rotation of the shaft 44.

The rotation of the casing 52 is normally resisted by the balancing springs 57. The springs 57 are augmented by the employment of a coil spring 58, which it is connected with, to control the casing 52, by means of a gear wheel 59 and a pinion 60. The pinion 60, as shown best in Fig. 6 of the drawings, is engaged with the wheel 59 and is mounted directly upon the pinion shaft 61.

Extended from the side of the casing 52 is a gear-toothed drum 62. The drum 62 is preferably provided with sprocket teeth to engage a sprocket chain section 63. The section 63 is operatively connected by means of a transmission member 64 with a wheel 65. The wheel 65 is mounted in the engine room apparatus 25 and is rigidly connected with a sleeve 66. The sleeve 66 has rigidly mounted thereon, the pointer 74.

When the shaft 36 is driven in any given direction, the casing 52, wheel 65 and pointer 74 are correspondingly moved. The member 64 engages a sprocket wheel $67^a$ on the shaft $67^b$. The sprocket wheel $67^a$ is operatively connected by a sprocket chain 67, which engages a sprocket wheel 68 fixedly mounted on a sleeve $68^a$, to which a pointer 69 is also rigidly attached. The pointer 69 and the pointer 74 are, by reason of the construction and arrangement above set forth, moved simultaneously and correspondingly to show on the engraved plates, over which the said pointers move, the direction in which the said shaft 36 is rotated.

Figure 2:
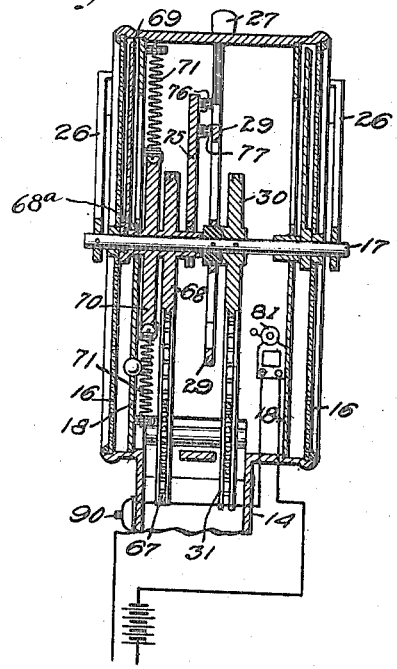
Fig. 2 is a section taken on the line 2—2 in Fig. 1.
Figure 3:
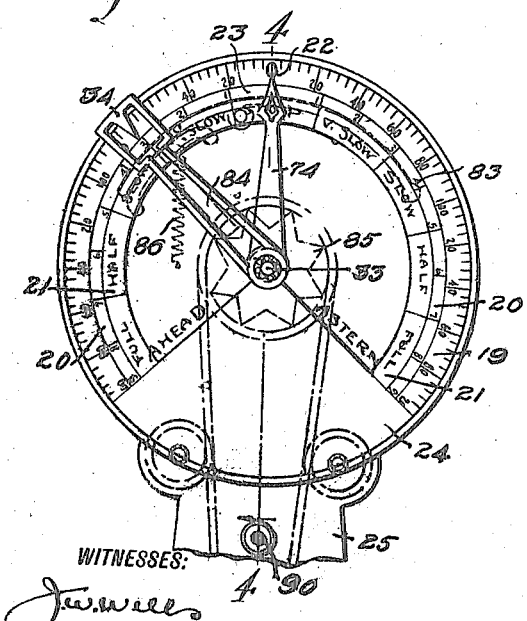
Fig. 3 is a face view of the engine room signal stand.
Figure 4:
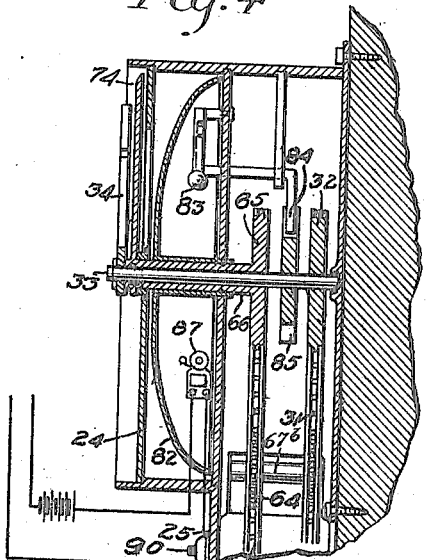
Fig. 4 is a section taken on the line 4—4 in Fig. 3.

To steady the operation of the pointer 69, a wheel 70 is connected by means of balancing springs 71, with the casing 15, as shown best in Fig. 2 of the drawings. It is to be remembered that the springs 57 and 58 operate to steady the casing 52; also to introduce on the line, a retractive influence or resistance, tending to return the pointers 69 and 74 to the zero point 22 on the casings in which they are mounted. In other words, if the speed has been set as indicated in Fig. 1 of the drawings as "ahead" and at the rate of three miles an hour, or of fifty-nine revolutions per minute, the pointers 69 and 74, under normal conditions, would be disposed, as shown in Fig. 9 of the drawings, to show in the opening of the yoke 26 and pointer 34. If, however, during the operation, the speed was reduced or increased so that pointers 69 and 74 are moved out of register with the pointer yoke 26 or the pointer 34, a signal will then notify the navigating officer of such result.

The signal above referred to, embodies the disk 29 and two rails 72 and 73. Mounted rigidly on the sleeve supporting the wheel 68 and the pointer 69, is an arm 75, as shown best in Fig. 2 of the drawings. The arm 75 is a contact member and to this end is provided with yielding wiper contacts 76 and 77, the former of which travels in the path of the rails 72 and 73, while the latter travels over the disk 29. The contacts 76 and 77 are preferably spring-seated. It will, however, be understood that any suitable construction may be substituted for this. The rails 72 and 73, as shown best in Fig. 1 of the drawings, are insulated from the casing 15. One terminal of each of the lamps 78 is connected with one of the rails 72—73, while the other terminal of each of said lamps, is connected with the said casing. The rails 72 and 73 are insulated each from the other and are separated by the insulating gap 79, shown in Fig. 1 of the drawings, the gap being disposed in the area radially coinciding with the neutral position of the zero point 22. A corresponding gap 80 is provided in the disk 29. When either of the contacts 76 or 77 are disposed in either of the gaps 79 or 80, the electric circuit for illuminating the lamps 78 is open. When, however, the contacts 76 and 77 rest on the rail 72 and the disk 29, or upon the rail 73 and the disk 29, the lamp 78 connected with the rail placed thus in circuit, is illuminated.

As seen best in Fig. 10 of the drawings, an audible signal in the shape of an electric bell 81 is in circuit with both of the rails 72 and 73. In this manner, the bell coöperates with both of the rails 72 and 73 and with the lamps 78, with which the said rails are electrically connected. The purpose of the signals, the lamps 78 and the bell 81, is to notify the navigating officer of the fact that his direction has not been answered. To this end said lamps 78 and bell 81 are in series with a battery 93 and with each other. The return connection 93ª of the electric system connections the operating mechanism of the bell 81 with the disk 29. If the pointer 69 is moved to correspond with the pointer 27, the arm 75 with which it is operatively connected moves over the insulating gap 80 and breaks the operating circuit for said bell and said lamps. If, however, the pointer 69 is not moved in correspondence, the arms 75 through the contacts 76 and 77 complete the operating circuit for said bell and said lamps, thereby notifying the navigating officer of the failure to respond to his signal.

*Operation.*

A signal constructed and arranged as above described and as shown in the accompanying drawings, is operated as follows:

The navigating officer on the navigating bridge of a mechanically-propelled vessel, desiring to move the vessel slowly ahead, say at the rate of three miles an hour, grasps the handle 27 of the yoke 26 and shifts the same to the position on the casing 15, shown in Fig. 1 of the drawings. The disk 29 is moved with the yoke 26, and the gap 80 in the said disk, is disposed in the area radially coincident with the arrow head 28. By means of the chain or belt 31, the pointer 34 in the engine room is moved in correspondence with the yoke 26.

The engineer's attention to the movement of the pointer 34, is attracted by the sounding of the bell 82, which is operated by the striker 83, the tail piece 84 whereof, is in the path of the star wheel 85, being deflected and operated by the projections thereof. Each time the tail piece 84 is deflected, the striker 83 is moved to extend the pull spring 86. Each time the tail piece is released, the spring 86, snaps the striker 83 to sound the bell 82.

The yoke 26 and the pointer 34 now remain in the position to which they have been moved by the navigating officer. The engineer's attention in the engine room, having been attracted, he is presumed to operate his engine in conformity with the signal. To move the vessel ahead, the shaft 36 is revolved in the direction conforming with such movement of the vessel and the drum 46 is rotated, driving by means of the members 47 and the shoes 48, the oil 54 in the casing 52. The casing 52 is thereby rocked on the shaft 44 and trunnion 53 to transmit through the chain section 63 and members 64 and 67, a rotary motion to the wheels 65 and 68 in the apparatus 25 and casing 15 respectively. Structurally connected with the said wheels 65 and 68, are the pointers 74 and 69. These pointers therefore indicate on the dials of the apparatus 25 in the engine room and on the casing 15 on the navigating bridge, the direction of movement of the shaft 36. The pressure of the oil 54 on the blades 55 corresponds with the speed of the drum 46, and the shaft 36 connected therewith. Thus, if the speed be slow, or such as to produce a movement of the vessel equal to three miles an hour, the casing 52 and the wheels 65 and 68 with the pointers 74 and 69, will be rocked to a position where the said pointers will coincide with the indication of the yoke 26 and pointer 34.

In the above manner, the engineer in the engine room and the navigating officer on the navigating bridge are both enabled to ascertain the operating condition of the shaft 36.

If, however, the engineer should fail to drive the shaft 36 in the direction or at the rate of speed indicated by the yoke 26 and pointer 34, the arm 75 operatively connected with the pointer 69, would move from the gap 79, but failing to coincide with the gap 80, would rest the contacts 76 and 77 on the rail 72 and the disk 29. This disposition of the contacts 76 and 77 would cause the illumination of the lamp 78 attached to the rail 72 and also operate the bell 81 in the casing 15. The navigating officer is in this manner notified of the failure to respond fully to the direction given. It will be understood that if by any chance, the engineer has mistaken the signal and operates the engine to drive the shaft in a reverse direction, the arm 75 with the contacts 76 and 77 passing through the rail 73 would illuminate the lamp 78 connected with the rail 73 and also actuate the bell 81.

Thus it will be seen that the pointers 69 and 74, will show the direction and rate of travel of the vessel; also that only when such direction and rate of travel coincides with the direction indicated by the yoke 26, will the signal lamps 78 be darkened and the bell 81 be silenced.

It is to prevent the boiling of the oil charge 54 that I provide a by-pass tube 88. The tube 88 has end openings which permit the oil, if boiled or too violently agitated, to escape the direct action of the paddle members 47 and the brake shoes 48. The tube 88 is provided at the highest point with a cap 89 for closing a filling opening for said tube, as shown best in Fig. 6 of the drawings.

The stand 14 and apparatus 25 are each provided with an electric push-button 90. These push-buttons are included in the electric circuits operating the bells 81 and 87. By employing said buttons, communication between the engineer in the engine-room and the navigating officer is facilitated. If in the course of operation the engineer desires to attract the attention of the navigating officer, he can accomplish this by pressing the button 90 in the engine room, while if the navigating officer, in turn, desires to attract the attention of the engineer, this is accomplished by pressing the button 90 disposed at the navigating station.

As seen best in Fig. 10 of the drawings, the bell 87 is operated by a separate circuit embodying a battery 91 and a lead wire 92, while the circuit for operating the bell 81 incorporates a second lead wire 94.

*Claims.*

1. A signal as characterized, comprising a rotary driven member; means for connecting said member with the propeller shaft of a vessel; a plurality of paddle members mounted on said member and radially extended therefrom; a rotary casing surrounding said member and having a plurality of resistance members disposed in juxtaposed relation to said paddle members; and a liquid charge filling said casing.

2. A signal as characterized, comprising a rotary driven member; means for connecting said member with the propeller shaft of a vessel; a plurality of paddle members mounted on said member and radially extended therefrom; a rotary casing surrounding said driven member and having a plurality of resistance members disposed in juxtaposed relation to said paddle members; a liquid charge filling said casing; and means for adjusting said resistance members to vary the resistance thereof.

3. A signal as characterized, comprising a rotary driven member; means for connecting said member with the propeller shaft of a vessel; a plurality of paddle members mounted on said driven member and radially extended therefrom; a rotary casing surrounding said driven member and having a plurality of resistance members disposed in juxtaposed relation to said paddle members; a liquid charge filling said casing; means for adjusting said resistance members to vary the resistance thereof; and a plurality of brake shoes, each pivotally mounted on said driven member, said shoes being arranged to be rocked into frictional engagement with said casing by the resistance of said liquid charge.

4. A signal as characterized, comprising a rotary driven member, means for connecting said member with the propeller shaft of a vessel; a plurality of paddle members mounted on said driven member and radially extended therefrom; a rotary casing surrounding said driven member and having a plurality of resistance members disposed in juxtaposed relation to said paddle members; a liquid charge filling said casing; means for adjusting said resistance members to vary the resistance thereof; and a plurality of brake shoes, each pivotally mounted on said driven member, said shoes being arranged to be rocked into frictional engagement with said casing by the resistance of said liquid charge, said brake shoes having each an elongated head for engaging said casing when rocked by said charge.

5. A signal as characterized, comprising a rotary driven member, means for connecting said member with the propeller shaft of a vessel; a plurality of paddle members mounted on said driven member and radially extended therefrom; a rotary casing surrounding said driven member and having a plurality of resistance members disposed in juxtaposed relation to said paddle members; a liquid charge filling said casing; means for adjusting said resistance members to vary the resistance thereof; a plurality of brake shoes, each pivotally mounted on said driven member, said shoes being arranged to be rocked into frictional engagement with said casing by the resistance of said liquid charge, said brake shoes having each an elongated head for engaging said casing when rocked by said charge; and means embodying a by-pass in said casing for permitting the liquid charge to evade said shoes and said resistance members.

In testimony whereof I have signed my name to this specification in the presence of two subscribing witnesses.

OLE K. BOGSTRAND.

Witnesses:
E. F. MURDOCK,
PHILIP D. ROLLHAUS.

Copies of this patent may be obtained for five cents each, by addressing the "Commissioner of Patents, Washington, D. C."